(12) United States Patent
Taguchi et al.

(10) Patent No.: US 8,913,825 B2
(45) Date of Patent: Dec. 16, 2014

(54) SPECULAR EDGE EXTRACTION USING MULTI-FLASH IMAGING

(71) Applicant: Mitsubishi Electric Research Laboratories, Inc., Cambridge, MA (US)

(72) Inventors: Yuichi Taguchi, Arlington, MA (US); Oncel Tuzel, Winchester, MA (US); Srikumar Ramalingam, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/933,369

(22) Filed: Jul. 2, 2013

(65) Prior Publication Data
US 2014/0015992 A1  Jan. 16, 2014

Related U.S. Application Data

(63) Continuation-in-part of application No. 13/549,791, filed on Jul. 16, 2012.

(51) Int. Cl.
 G06K 9/00 (2006.01)
 G06T 7/00 (2006.01)
 H04N 5/225 (2006.01)

(52) U.S. Cl.
 CPC ............ *H04N 5/2256* (2013.01); *G06T 7/0073* (2013.01); *G06T 2207/30136* (2013.01); *G06T 7/0042* (2013.01); *G06T 2207/10024* (2013.01)
 USPC .......................................... 382/165; 382/190

(58) Field of Classification Search
 None
 See application file for complete search history.

(56) References Cited

U.S. PATENT DOCUMENTS

| | | | |
|---|---|---|---|
| 7,206,449 B2* | 4/2007 | Raskar et al. ................. | 382/199 |
| 8,165,403 B1* | 4/2012 | Ramalingam et al. ........ | 382/190 |
| 2004/0184653 A1* | 9/2004 | Baer et al. ..................... | 382/145 |
| 2009/0122058 A1* | 5/2009 | Tschesnok .................... | 345/420 |
| 2009/0135244 A1* | 5/2009 | Kim et al. ....................... | 348/36 |
| 2009/0297020 A1* | 12/2009 | Beardsley et al. ............. | 382/154 |
| 2010/0245355 A1* | 9/2010 | Chang ........................... | 345/426 |
| 2010/0296724 A1* | 11/2010 | Chang et al. .................. | 382/154 |
| 2011/0087998 A1* | 4/2011 | Samadani et al. ............ | 715/838 |
| 2011/0157178 A1* | 6/2011 | Tuzel et al. .................... | 345/426 |
| 2013/0156262 A1* | 6/2013 | Taguchi et al. ............... | 382/103 |

FOREIGN PATENT DOCUMENTS

JP            2010243478 A   * 10/2010

* cited by examiner

Primary Examiner — Vu Le
Assistant Examiner — Samah Beg
(74) Attorney, Agent, or Firm — Dirk Brinkman; Gene Vinokur

(57) ABSTRACT

A method and system extract features from an image acquired of an object with a specular surface by first acquiring an image while illuminating the object with a hue circle generated by a set of lights flashed simultaneously. The lights have different colors and are arranged circularly around a lens of a camera. Then, the features correspond to locations of pixels in the image within a neighborhood of pixels that includes a subset of the colors of the lights.

16 Claims, 13 Drawing Sheets

100

Specular edge extraction using white light MFC

1: Capture $N$ images, $I_i (i = 1, \ldots, N)$, by flashing a single light source at a time.
2: Compute the minimum illumination image: $I_{min}(x) = \min_i I_i(x)$.
3: for each captured image do
4:   Compute a ratio image: $R_i(x) = I_i(x)/I_{min}(x)$.
5:   Determine pixels with specular highlights by thresholding the ratio image $R_i(x)$.
6: end for
7: for each pixel $x$ do
8:   Count the number ($= C$) of images including specular highlight pixels within an $\epsilon$ neighborhood.
9:   if $C \geq C_{th}$ then
10:     Mark $x$ as a specular edge.
11:   end if
12: end for

*Fig. 6*

Specular edge extraction using hue circle MFC

1: Capture a single images $M$ by simultaneously flashing $N$ color light sources approximating a hue circle.
2: Convert $M$ into the HSV color space, each component denoted by $M^H$, $M^S$, and $M^V$.
3: for each pixel $x$ do
4:   if $M^V(x) > V_{th}$ and $M^S(x) < S_{th1}$ then
5:     Select hues within an $\epsilon$ neighborhood having sufficient saturation: $\{M^H(y)|y \in \epsilon, M^S(y) > S_{th2}\}$.
6:     Vote the hues to a histogram with $N$ bins and count the number of non-empty bins ($= D$).
7:     if $D \geq D_{th}$ then
8:       Mark $x$ as a specular edge.
9:     end if
10:   end if
11: end for

*Fig. 8*

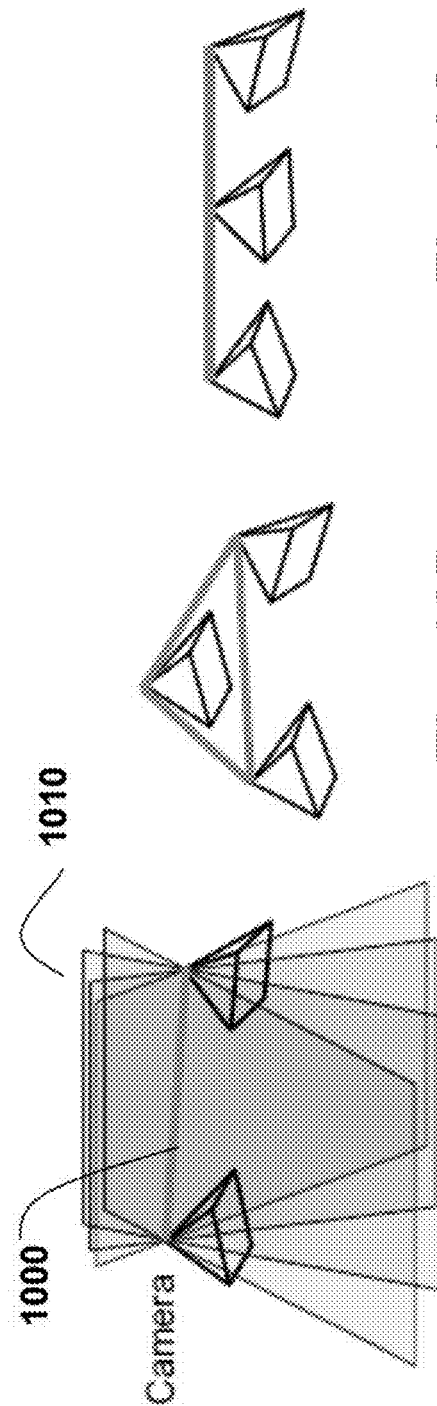
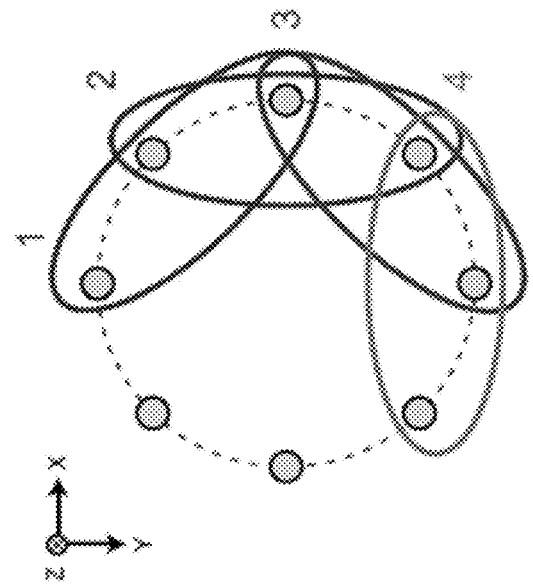
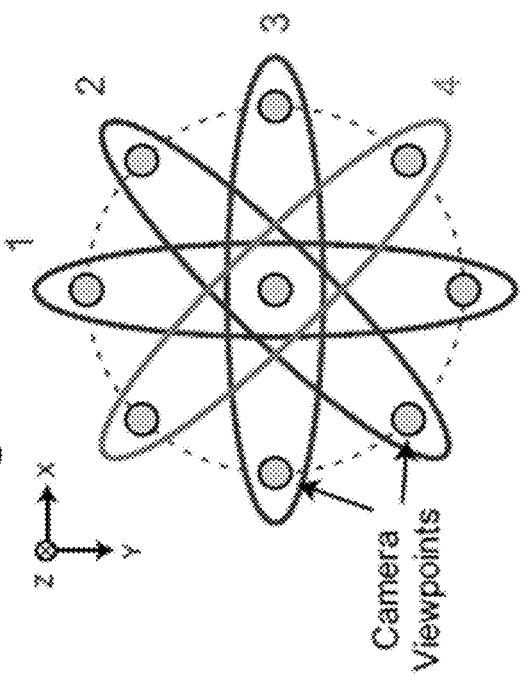
Fig. 10A  Fig. 10B  Fig. 10C  Fig. 10D  Fig. 10E

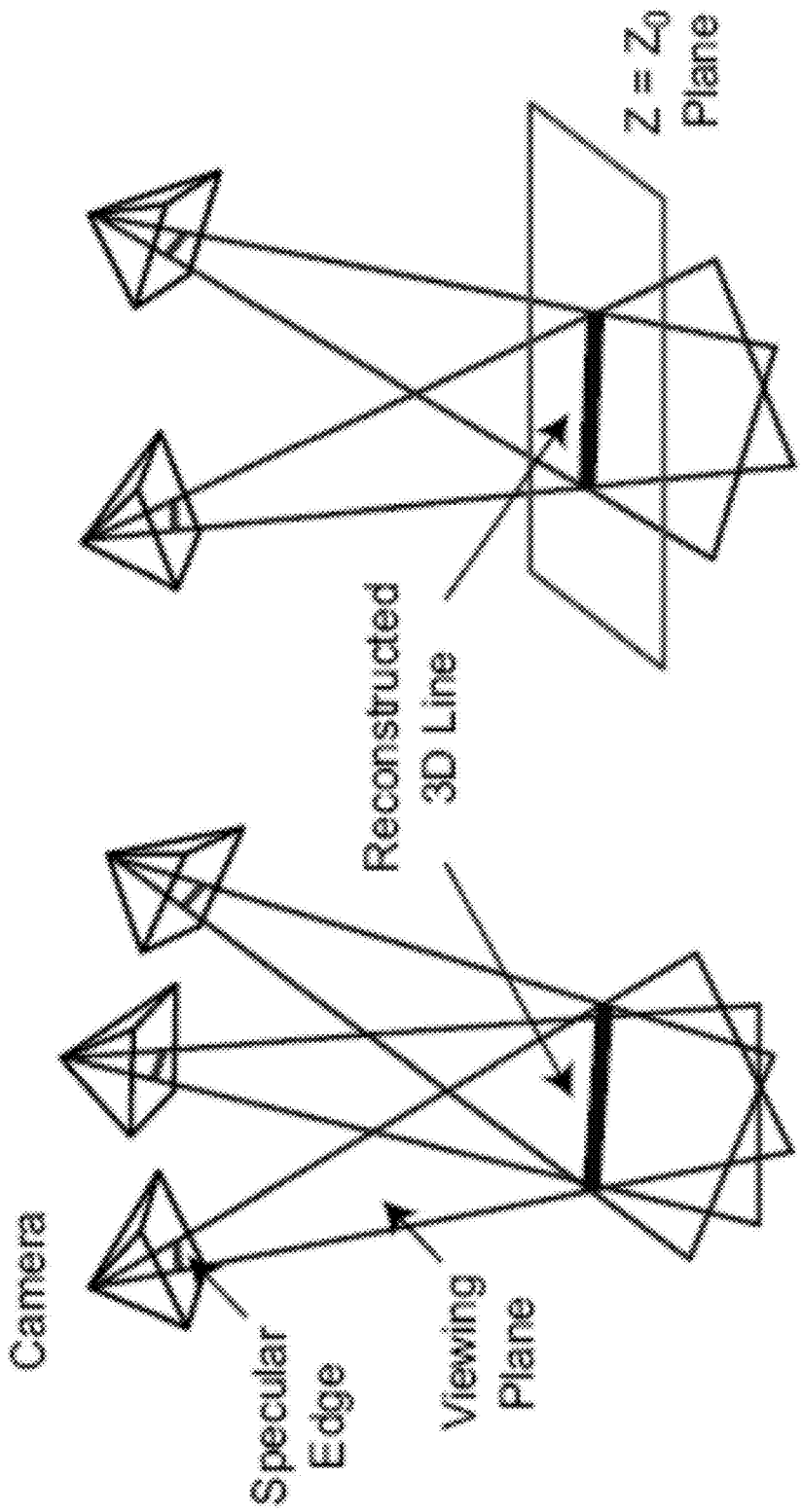

SPECULAR EDGE EXTRACTION USING MULTI-FLASH IMAGING

RELATED APPLICATIONS

This application is a continuation-in-part of U.S. application Ser. No. 13/549,791, "Method and Apparatus for Extracting Depth Edges from Images Acquired of Scenes by Cameras with Ring Flashes Forming Hue Circles," filed by Assignee of the present application on Jul. 16, 2012 and incorporated herein by reference.

FIELD OF THE INVENTION

This invention relates generally to computer vision, and more particularly to extracting features from specular objects using active illumination.

BACKGROUND OF THE INVENTION

Advances in sensing technology and computer vision have enabled automation of many industrial tasks that require interaction with uncontrollable and dynamic environments. However, several problems persist with Objects that do not have a near-Lambertian reflectance. Specular objects with mirror-like transparent, or translucent surfaces possess material properties that are frequently considered as noise sources, and several methods attempt to suppress the impact of those effects. This means that objects that are either highly specular or have significant transparency cannot be handled by such methods because those material effects cannot be completely suppressed.

One application of interest is handling screws. Screws form a fundamental class of objects used in manufacturing systems. More threaded screws are produced each year than any other machine elements. In conventional assembly lines, the screws are placed into a part holder with a known pose (3D translational position and 3D rotational orientation) before a robot arm grasps and manipulates the screws. This operation requires either specially designed hardware, such as a part feeder, for each screw type, or manual manipulation.

The majority of screws are made from shiny metallic materials and have specular surfaces. The presence of threads further complicates the problem. Therefore, the screws cannot be handled easily by conventional computer vision methods. In addition, pose estimation of a screw in a bin is a very challenging problem because of clutter and occlusions. The problem is particularly difficult because the bin can contain hundreds of screws in innumerable possible poses.

Computer-Vision-Based Bin Picking

The primary problem in bin picking systems using computer vision is to estimate the poses of industrial parts. The problem has many challenges mainly because of specular reflections from the metallic surfaces of industrial parts, and occlusions in a cluttered bin.

Model-based pose estimation methods use correspondences between 2D image features and 3D model points. Unfortunately, the 2D-to-3D point correspondences are hard to obtain for industrial parts due to their specular surfaces. The problem is particularly severe when multiple identical objects overlap each other.

Object contours can provide information about object identities and their poses, and there exists various contour matching methods. However, for specular objects, the contour information is difficult to obtain in a cluttered bin, because the objects do not have an appearance of their own. Instead, the objects reflect the surrounding environment, e.g., other objects, the bin, and the gripper.

Range sensors have been used for pose estimation. Range data can be used to group surface features, which are used to generate and verify an estimated object pose. Several pair features can be used in a voting framework for bin picking using a range sensor. However, in the presence of specularities, range sensors fail to produce accurate depth maps. In addition, range sensors are expensive when compared with camera-based systems.

Specularities

Specularities are generally treated as a source of noise in computer vision applications. Most computer vision methods identify and remove specularities to reduce inference. Accurate feature extraction in the presence of strong specularities is a challenging task.

U.S. application Ser. No. 12/950,357 describes a method for extracting features from images of specular objects using an active illumination camera. That method uses multiple lights surrounding a lens of the camera, and acquires multiple images by flashing one light at a time. By analyzing motion of specular highlights appearing in the multiple images acquired, that method extracts the features on high-curvature regions on specular objects facing the camera. That method required multiple images to be acquired, which is time consuming.

U.S. application Ser. No. 13/549,791 describes a method for determining depth edges of objects using an active illumination camera. One or more images are acquired while flashing all the lights forming a hue circle around a lens of a camera at the same time. Depth edges are extracted by analyzing the colors of shadows cast by the lights. That method does not exploit specular reflections.

SUMMARY OF THE INVENTION

The embodiments of the invention provide a method for extracting features from images of specular objects. The images are acquired by an active illumination camera. The active illumination camera uses multiple color lights surrounding a lens of the camera forming a hue circle. Each image is acquired while flashing all the lights simultaneously. This color multiplexing enables feature extraction for specular objects using a single image, instead of multiple images as in the prior art. The method uses the features to estimate poses of the specular objects, e.g., shiny metal screws in a bin. The poses can be used to pick the objects out of the bin using, a robotic arm or other means.

The invention is based on the realization that when images are acquired while illumination sources are arranged circularly around a camera lens, the specular highlights visible in the images appear in a circular region with a radius inversely proportional to the curvature of the surface. This enables the method to identify regions of the object that have a large surface curvature and a normal towards the camera, which are called specular edges. In addition, the embodiments provide a multiplexing scheme using color lights approximating a hue circle, which enables pose estimation from a single image.

The specular edges can be used for a robotic bin-picking application by reconstructing the axes of screws as 3D lines. Degeneracy on the 3D line reconstruction is avoided by using a circular camera trajectory, leading to a system that acquires only a single image fir picking each screw consecutively. The method can perform automatic detection and pose estimation of small shiny screws in a cluttered bin, achieving, position and orientation errors less than 0.5 mm and 0.8°, respectively.

BRIEF DESCRIPTION OF THE FIGURES

FIG. 6 is a block diagram of pseudocode for extracting specular edges using a white light multi-flash camera according to embodiments of the invention;

FIG. 8 is a block diagram of pseudocode for extracting specular edges using a hue circle multi-flash camera according to embodiments of the invention;

FIG. 10A is a schematic of planes passing through a line joining the two camera centers according to embodiments of the invention;

FIG. 10B is a schematic of three random viewpoints according to embodiments of the invention;

FIG. 10C is a schematic of three viewpoints on a straight line according to embodiments of the invention;

FIG. 10D is a schematic of camera viewpoints for picking screws with different orientations according to embodiments of the invention;

FIG. 10E is a schematic of camera viewpoints for overlapping multiple pickup cycles in bin picking according to embodiments of the invention;

FIG. 11A is a schematic of line reconstruction using three camera viewpoints according to embodiments of the invention; and FIG. 11B is a schematic of line reconstruction using two camera viewpoints according to embodiments of the invention.

DETAILED DESCRIPTION OF THE PREFERRED EMBODIMENTS

System Overview

Figure 1:
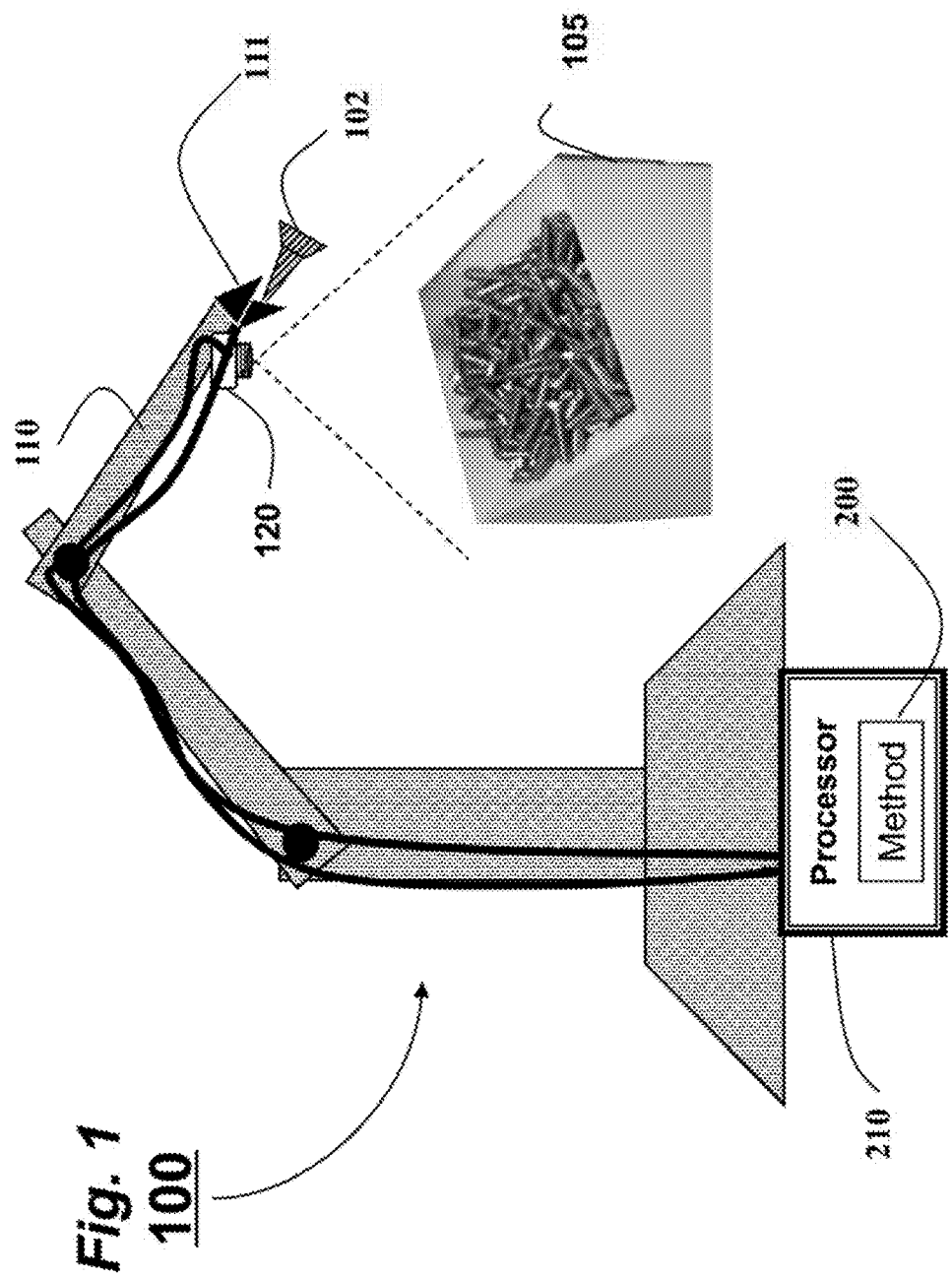
FIG. 1 is a schematic of a system for determining a pose of an object according to embodiments of the invention.

FIG. 1 shows a system 100 and method 200 for determining poses of objects according to embodiments of our invention. In particular the objects are metallic screws or bolts 102 arranged in a bin 105 of hundreds of identical or different kinds of objects. Since the objects have shiny surfaces, the objects appear specular when illuminated. This makes it difficult to detect the objects in images of the scene, because the objects reflect the surrounding environment, and the textureless objects themselves are difficult to discern.

We use a 6-axis robot arm 110, on which a multi-flash camera (MFC) 120 is mounted. The MFC has multiple point lights arranged around the lens, and acquires images while illuminating the scene. A method determines a pose of each object to be picked by a gripper 111 using a set of images of each object. The method can be performed in a processor 210 connected to memory and input/output interfaces as known in the art.

Multi-Flash Camera and Hue Circle

Figure 2A:
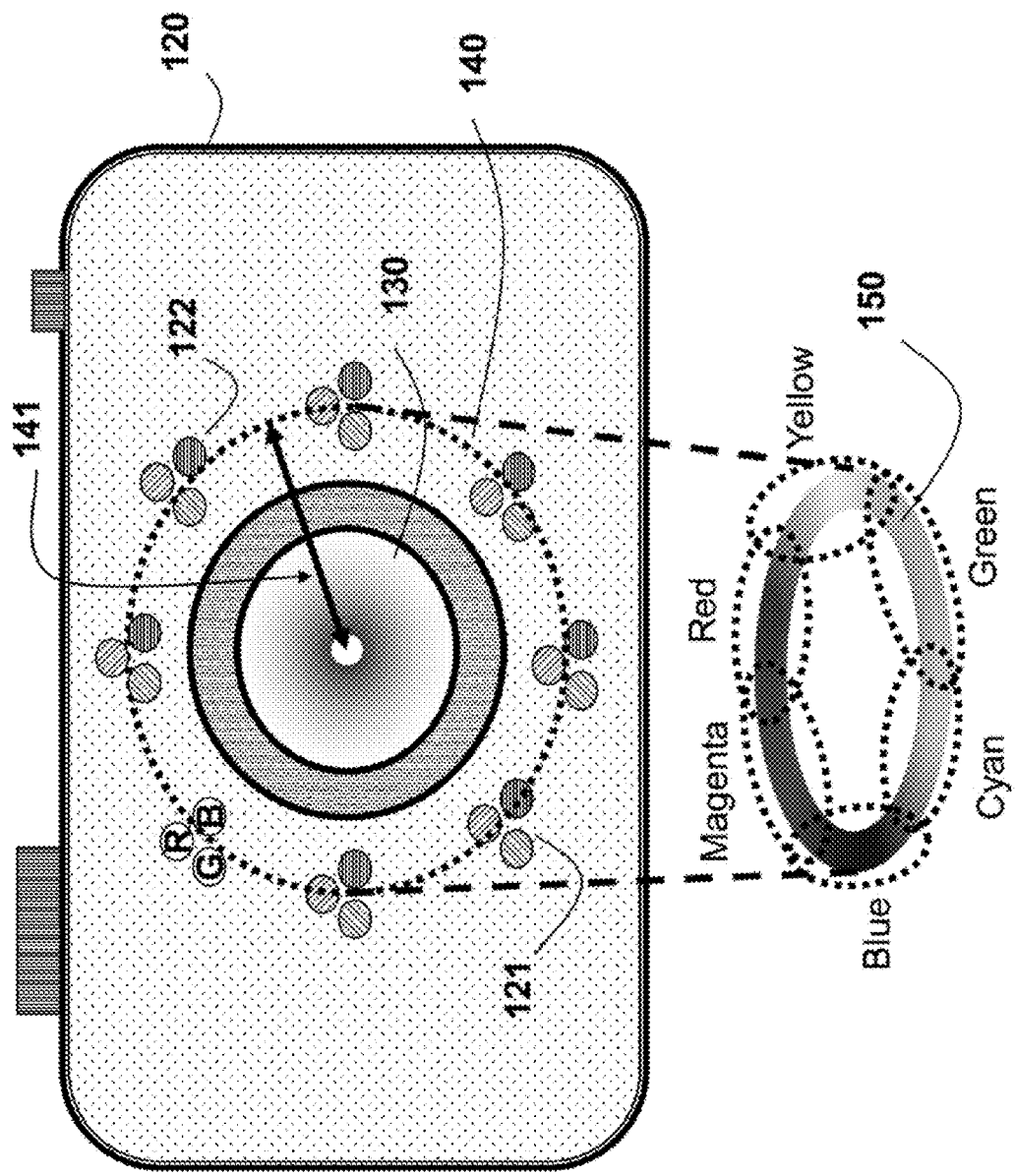
FIG. 2A is a schematic of a camera and a set of lights to form a hue circle according to embodiments of the invention.

As shown in FIG. 2A, the lights are in the form of e.g., eight sets of three RGB light emitting diodes (LEDs) that are arranged around a lens 130 of the camera 120 in a substantially circular pattern 140. It should be understood that the lights can be in other forms, e.g., eight sets of broad-spectrum (white) lights with different color filters. It should be also understood that sets of other sizes and arrangements can be used.

Figure 2B:
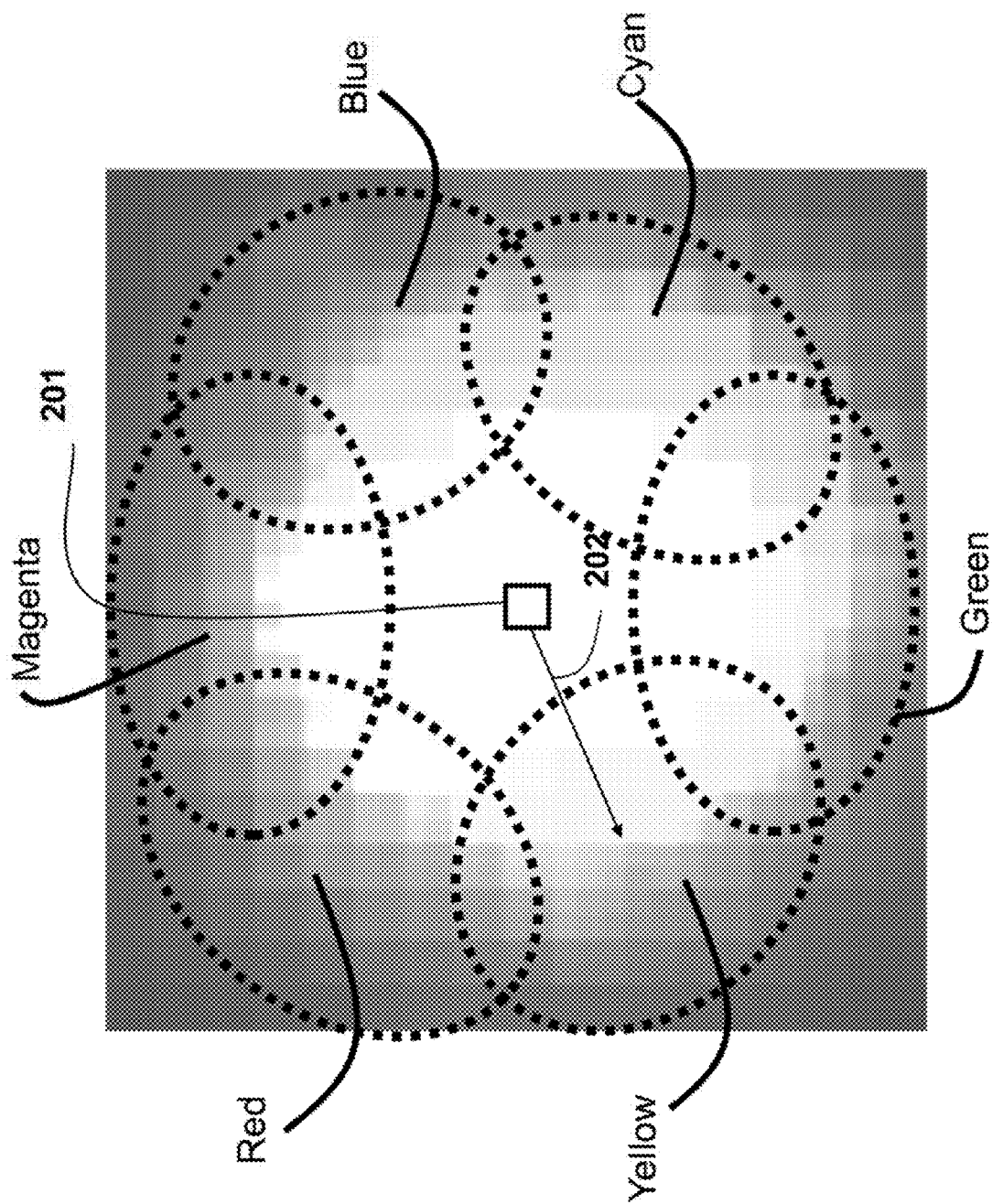
FIG. 2B is a portion of an image showing a pixel location at the center of a neighborhood of pixels that are colored by different color light sources forming, a hue circle according to embodiments of the invention.

The lights produce colors corresponding to a hue circle 150, i.e., the colors substantially span a continuous spectrum from 0° to 360° of the hues. In the hue circle, complementary colors are located at any position and its antipole. For example, lights 121 and 122 have complementary colors. In the preferred embodiment, the lights are arranged in the circular pattern uniformly. The radial distance 141 of the lights from the optical axis of the lens can vary. Instead of flashing a single light at a time as in conventional methods, the embodiments flash all lights simultaneously for each image to reduce the number of images to be acquired for each pose to one, As shown in FIG. 2B when the lights are reflected by a region of high curvature on the specular surface, a pixel location 201 in the region is surrounded by pixels that are colored by a set or subset different colors of the lights forming the hue circle.

The colors are approximately indicated for oval regions A radius 202 of the substantially circular neighborhood centered at the location is inversely proportional to a curvature of the surface. The pixel locations whose neighborhood includes several different hues corresponding the set or subset of the colors of the lights are the basic low-level features extracted by the invention. Ideally the neighborhood should include all the different hues of the color lights, i.e., the neighborhood should be "very colorful." However, the term "subset" is used because in reality it is sufficient to observe only a small portion of all the different hues as indicated by the threshold $D_{th}$ with reference to FIG. 8. Thus, the term subset is used herein to mean all or some of the colors in the hue circle.

Figure 2C:
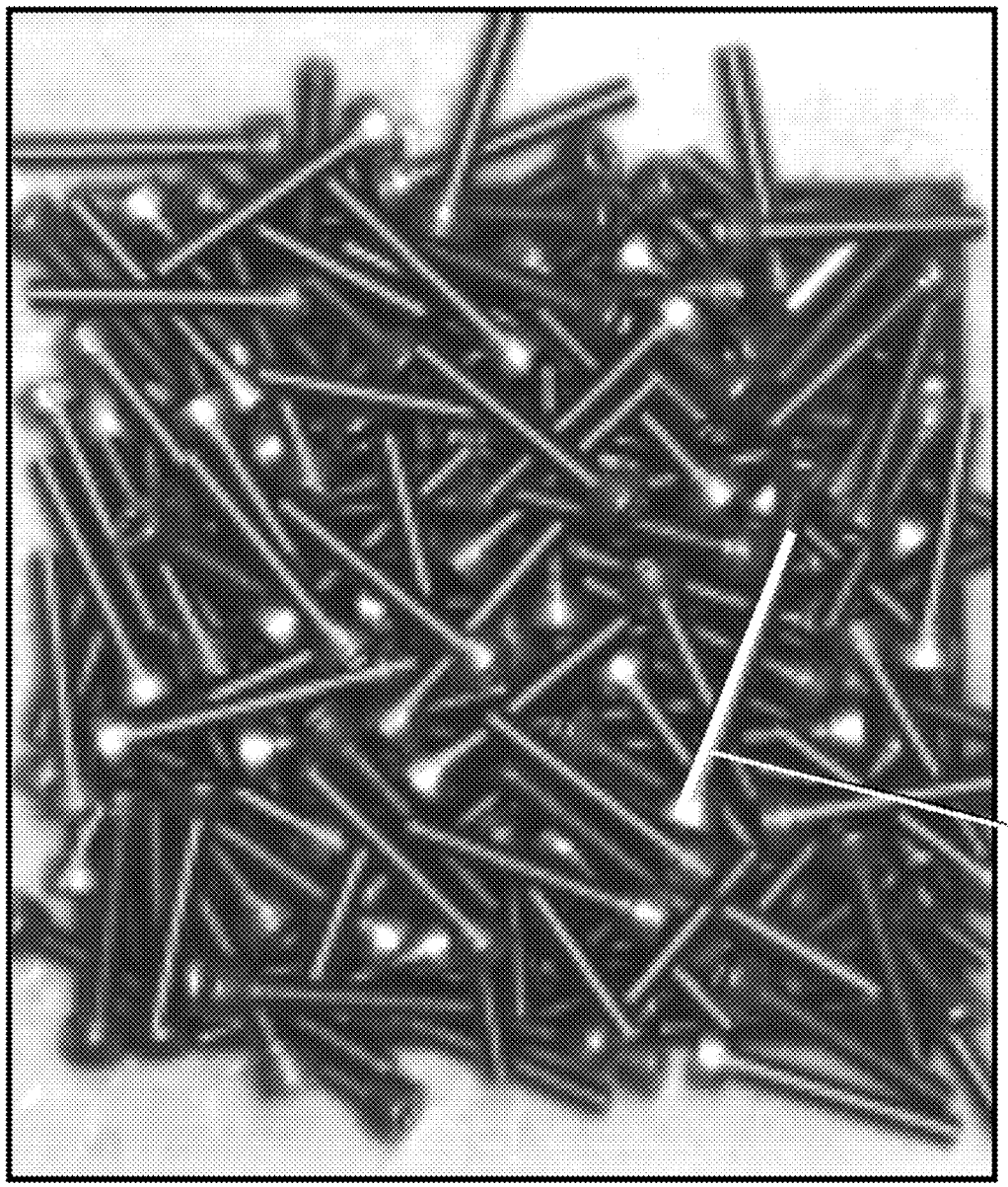
FIG. 2C is an image of a line fitted to specular edge features according to embodiments of the invention.

As Shown in FIG. 2C when a line segment 203 is fitted to the above features specular edges) on a surface of a screw, a projection of the axis of the screw onto the image can be identified. It should be understood that other embodiments can manipulate the locations and radii to form other higher level features, such as features corresponding to other arbitrary shapes or characteristics of the surface, e.g., arcs, circles and the like.

Figure 3:
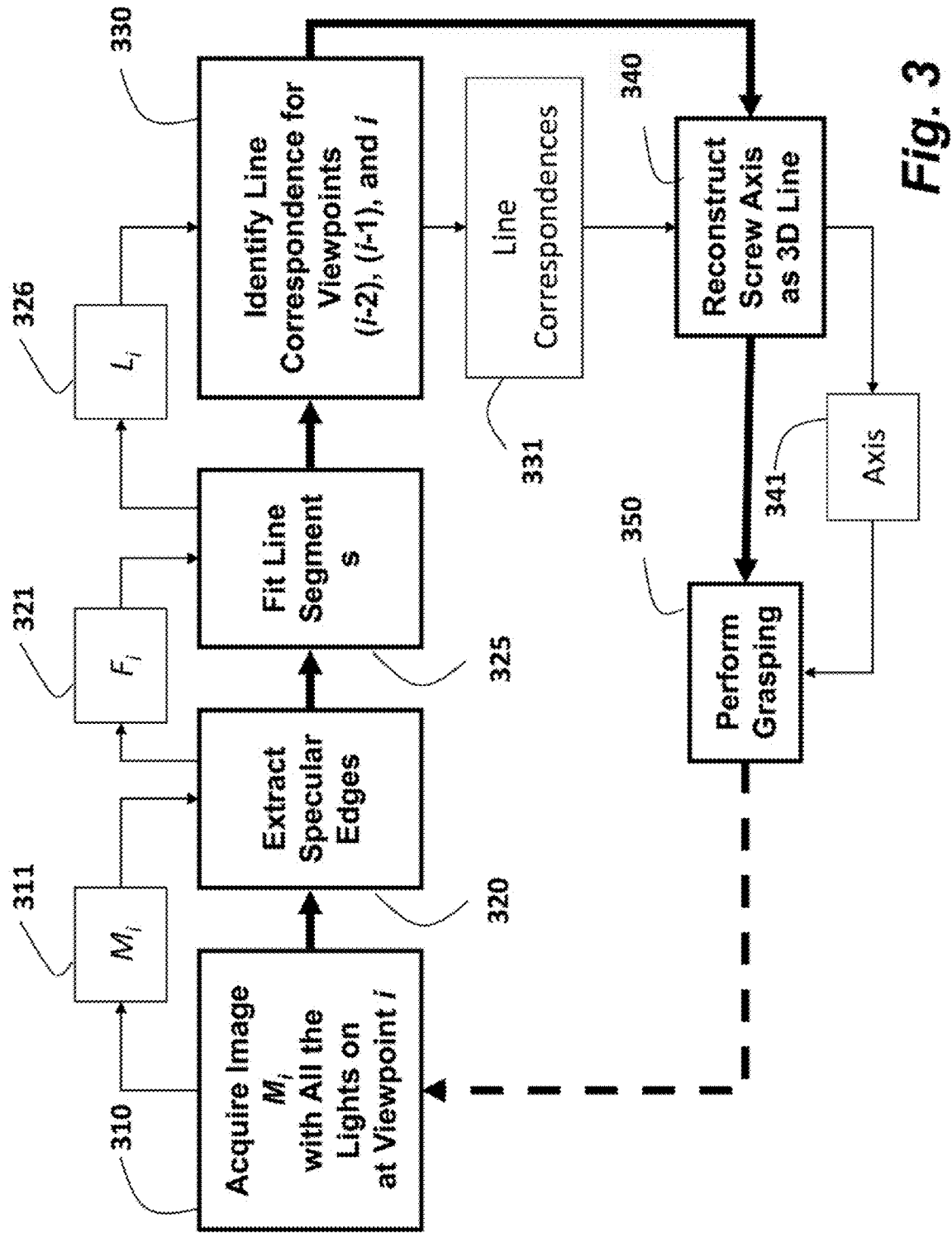
FIG. 3 is a flow diagram of a method for determining a pose of an object according to embodiments of the invention.

FIG. 3 shows the method for determining the pose of the object. An image $M_i$ 311 is acquired 310 of the scene, e.g., screws in the bin, with the camera at viewpoint i. Specular edges ($F_i$) 321 are extracted 320. The specular edges are associated with the locations of pixels that are surrounded by a neighborhood of pixels as described above. Line segments ($L_i$) 326 are fitted 325 to the specular edges in the image.

Line correspondences 331 are identified 330 in images of two previous viewpoints and the current viewpoint, e.g., (i−2), (i−1), and (i). A screw axis 341 is reconstructed 340, which can then be used to grasp 350 the screw and pick it from the bin. At this point, the camera can be moved to a next overlapping viewpoint, see FIG. 10E, and the process repeats for the next screw at step 310 until all screws in the bin are picked. This way, only a single image is required to pick each screw. The cycle using overlapping viewpoint is not present in previous implementations. It is understood that the start up situation to acquire the initial three images is trivial and need not be described.

Specular Edge Extraction

Figure 4:
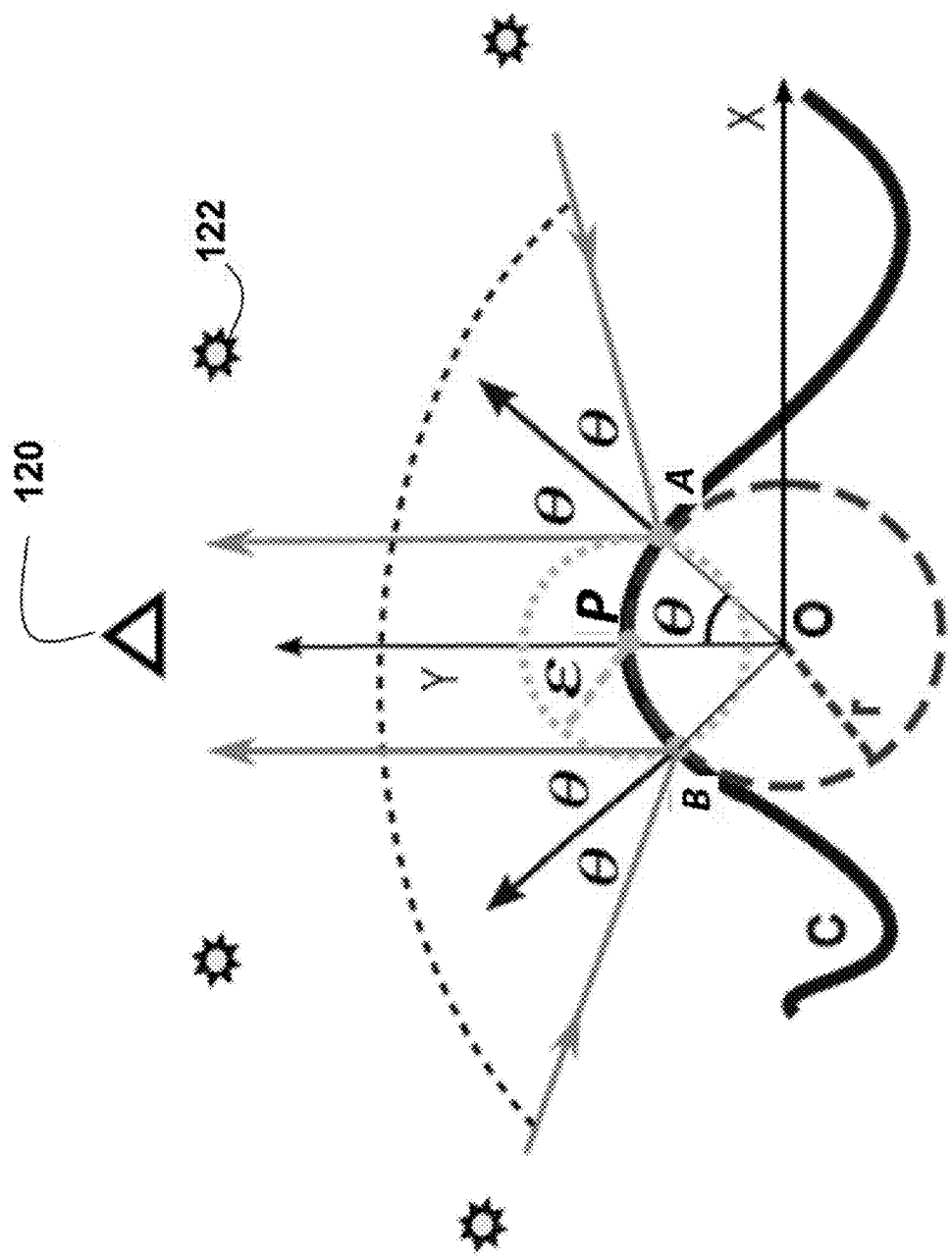
FIG. 4 is a schematic of reflection of light rays from the surface of a specular object according to embodiments of the invention.

As shown in FIG. 4, we analyze the reflection of light rays from the surface of a specular object and derive feature extraction methods that detect high curvature regions. In brief, we analyze of a relation between curvature and a cone of rays. Point P has curvature $\kappa$. If the illumination direction is within the cone of $[-2\theta\ 2\theta]$, then the specular highlight is acquired by the camera within the $\epsilon$ neighborhood of the point (pixel).

Specular Reflection Analysis

Consider a point P on an arbitrary one dimensional curve C. Let r be the radius of an osculating circle at P. Then, the curvature $\kappa$ at P is $$\kappa = \frac{1}{r}. \quad (1)$$

Consider the $\epsilon$ neighborhood at the point P as shown in FIG. 4. Because $\epsilon$ is small enough, we assume the curvature in this neighborhood to be constant for our analysis. Without loss of generality, we consider the two-dimensional coordinate axes with origin as the center of the osculating circle O, Y-axis passing through P and X-axis orthogonal to Y. The $\epsilon$ circle (sphere in 3D) meets the curve C at A and B with $\theta$ given by $$\theta = 2\sin^{-1}\left(\frac{\epsilon\kappa}{2}\right). \quad (2)$$

Now, consider the ray towards A from the camera placed on the Y-axis. The camera center is assumed to be at $(0, y_0)$ such that $y_0$ is much greater than $\epsilon$. This implies that the ray coming from the camera center can be considered parallel to the Y-axis as shown in the FIG. 4. This ray subtends an angle $\theta$ with the normal at A and is reflected at the angle $\theta$ from the normal. Symmetrical analysis holds true for point B. This shows that if the light, is placed anywhere within this cone of $[-2\theta\ 2\theta]$, then the camera receives specular reflection from the $\epsilon$ neighborhood.

Figures 5A, 5B:
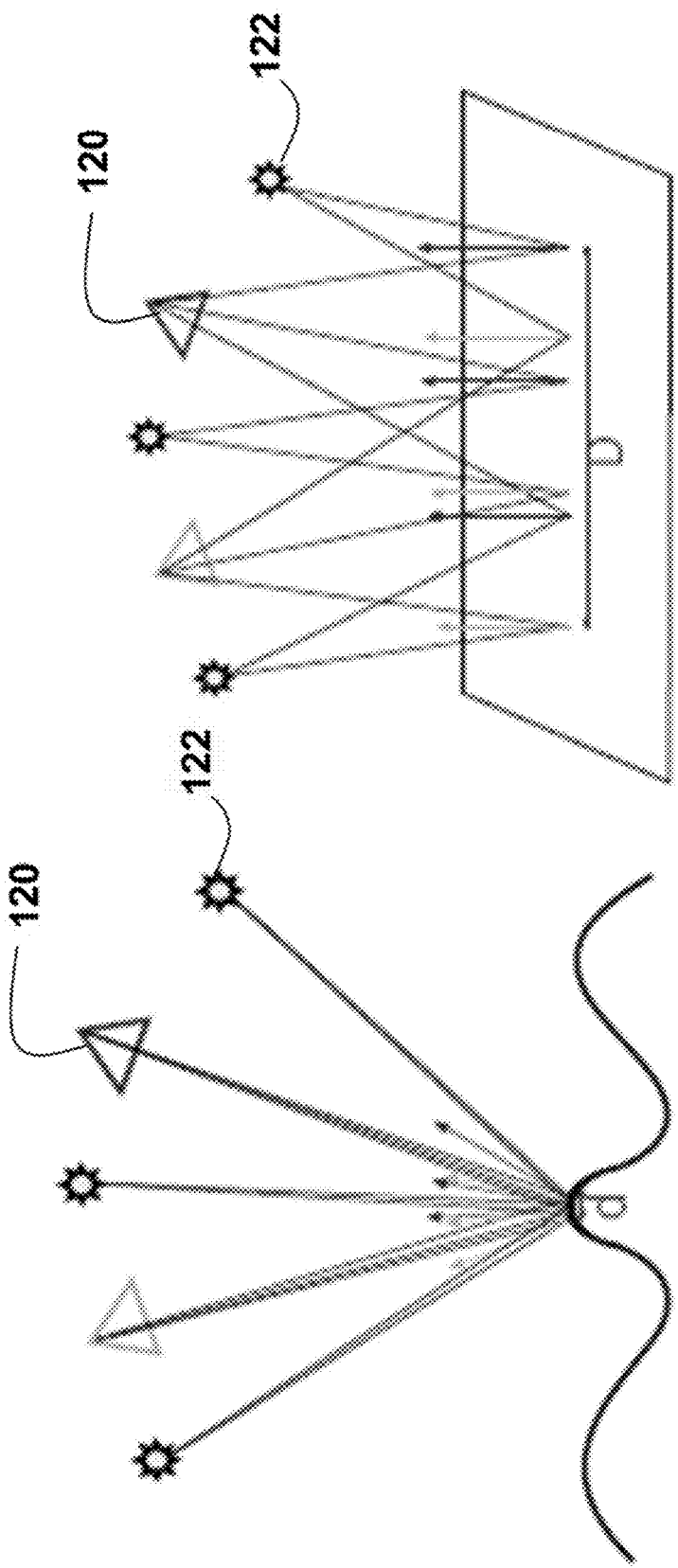
FIG. 5A is a schematic of reflections from a curved surface according to embodiments of the invention.
FIG. 5B is a schematic of reflections from a flat surface according to embodiments of the invention.

For a fixed cone $[-2\theta\ 2\theta]$ the size of the $\epsilon$ neighborhood is inversely proportional to the curvature of the point, $$\epsilon = \frac{2}{\kappa}\sin\frac{\theta}{2},$$

by using the distant camera assumption. As the curvature increases, the reflections are visible within a small neighborhood of the point as shown in FIG. 5A. In contrast, when the surface is substantially flat, i.e., the curvature is close to zero, reflections are not visible within the neighborhood of the point as shown in FIG. 5B.

Based on this realization, we detect features on the high curvature regions of the object. Note that this analysis assumes mirror-like reflection. When the specular lobe is considered, this cone of rays can be increased by $2\sigma$, where $\sigma$ is the width of specular lobe.

The analysis can be extended for a two dimensional surface S. The principal curvatures are defined as the minimal and maximal values of the curvature measured along various directions at a given point. The Gaussian curvature $\kappa$ of a surface is given by the product of principal curvatures $\kappa_1$ and $\kappa_2$ of the point:

$$\kappa = \kappa_1\kappa_2. \quad (3)$$

Similarly for a two dimensional surface, the reflections are visible within a smaller neighborhood of the point as the Gaussian curvature of the point increases. Note that both principle curvatures have to be large to observe the reflection within a small neighborhood. For example, a sphere with small radius is a surface with both principal curvatures large ($\kappa_1 = \kappa_2 = 1/r$ for all the points on the sphere). Therefore, the reflection is visible within a small neighborhood. In contrast, the Gaussian curvature of a point on a cylindrical object is zero because the surface curves only in one direction. Hence, the reflection may not be visible within an immediate neighborhood.

Specular Edge Extraction Using the White Light MFC

Our feature extraction method locates points on the specular surface that have large Gaussian curvature, which curve in two directions, and with normals towards the camera. Although the second requirement seems like a restriction, in fact the high curvature regions span a large set of surface normals. These features, which we call specular edges, provide sufficient information for pose estimation of specular objects. It is understood that the term "edge" is used loosely here.

Here, we consider using an MFC with while lights flashed sequentially to extract specular edges. This MFC contains eight point (white) lights (LEDs) arranged in a circle around the camera. As the different LEDs around the camera flash at different times, the specular highlights on the surface move depending upon the curvature. With the changing flash positions, specular highlights at high curvature regions stay within a small neighborhood d as shown in FIG. 5A. In contrast, the specular highlights shift by a large amount in a substantially flat curvature regions D as shown in FIG. 5B.

We use this realization to detect pixels that correspond to the high curvature regions on the object having normals towards the camera. The specular edges serve as a feature that is both characteristic of the object's 3D shape and its relative pose with respect to the camera.

FIG. 6 shows the pseudocode for our specular edge extraction using the white light MFC. The variables used in this pseudocode and other pseudocodes are described in detail herein. We acquire N images, $I_i$, corresponding to, e.g., 8 sequential flashes. We determine the minimum intensity value at each pixel location among the acquired images to produce the minimum illumination image $I_{min}$. The minimum illumination image is similar to the surface albedo. Because the surfaces we consider are highly specular and the specular highlights move across the images, the minimum illumination image appears to be dark for all the specular regions.

We determine a ratio image $R_i$ for each acquired image by dividing the image by the minimum illumination image. Ideally, the ratio values in non-highlight regions remain close to one, while the ratio values in specular highlight regions are greater than 1. We threshold the ratio images to detect the highlight regions at each flash image. We select the neighborhood e, e.g., 3×3 pixels, and determine the number of images in which specular highlight exists within this $\epsilon$ neighborhood.

For pixels corresponding to high curvature regions, the specular highlight remains within the $\epsilon$ neighborhood and therefore a specular highlight is observed in all the MFC images within the $\epsilon$ neighborhood. For pixels corresponding to low curvature regions, the specular highlight moves outside the $\epsilon$ neighborhood, and therefore the number of images in which the specular highlight is observed within the $\epsilon$ neighborhood is small. We determine specular edges when the number of images including a specular highlight is greater than a threshold, we set $C_{th}=8$.

Note that pixels that correspond to Lambertian surfaces are filtered automatically because of normalization with respect to the minimum image. The reflections of ambient lights are also Filtered because their positions do not change in all the MFC images.

Specular Edge Extraction Using the Hue Circle MFC

The specular edge extraction method using the white light MFC requires N images by flashing; a single light at a time. With the hue circle MFC, a single image specular edge extraction method is possible.

Figure 7:
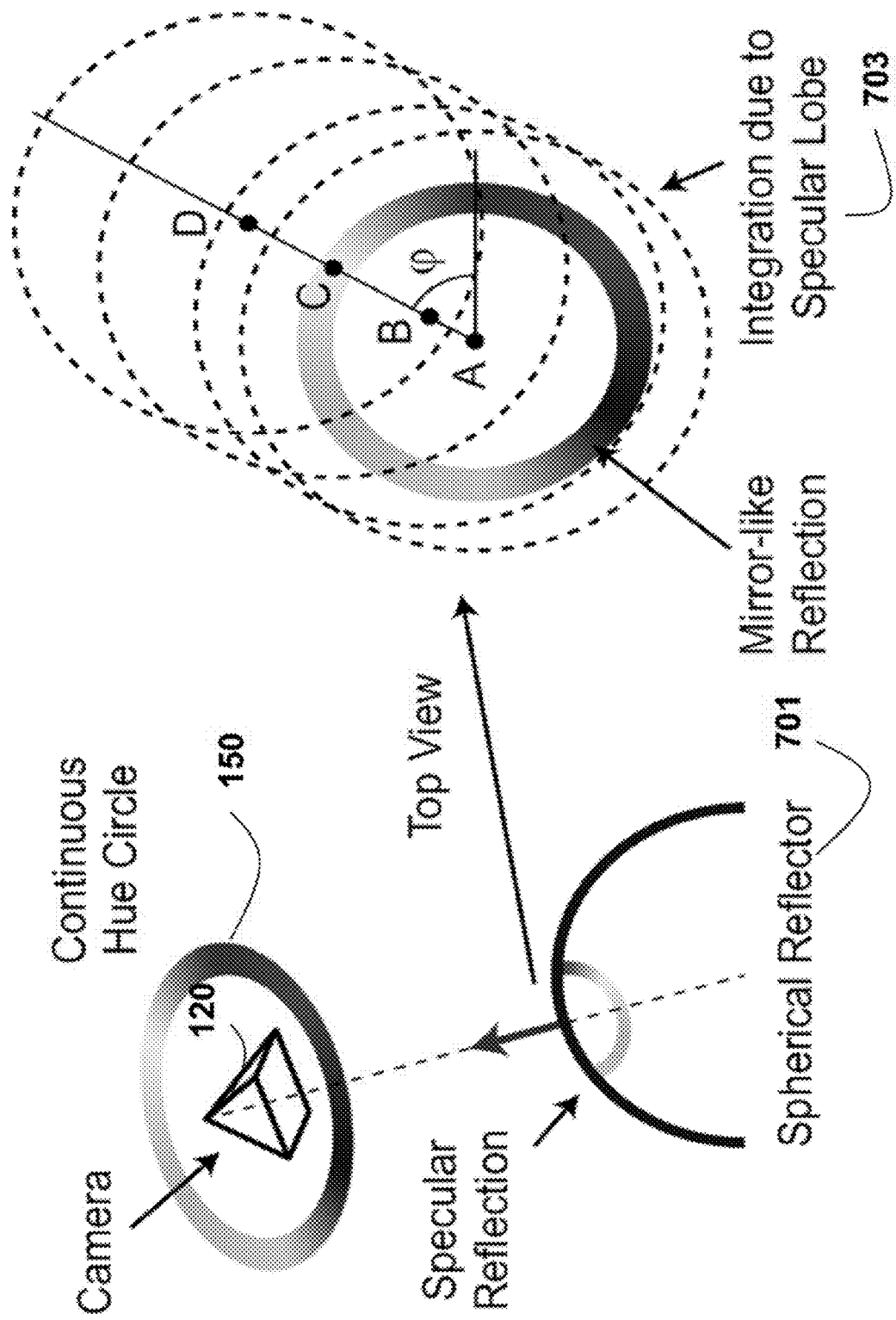
FIG. 7 is a schematic of a ring light source around a camera forming a continuous, maximally saturated hue circle and a reflection of the ring light source on a spherical reflector according to embodiments of the invention.

As shown in FIG. 7, the ring light around the camera forms a continuous, maximally saturated hue circle 150. For simplicity, we consider a spherical reflector 701. Specular highlights appear in a small neighborhood around the normal towards the camera. The mirror-like reflection produces the continuous hue circle on the surface of the reflector. The size of the circle depends on the curvature of the surface.

We consider the effects of reflections due to the specular lobe. We assume that the specular lobe acts as a convolution with a fixed-size disk kernel on the image plane. In this case, all the colors in the hue circle are mixed at the center region, e.g., points A and B, resulting in a neutral (white) color. In contrast, only a part of the hues is integrated in the peripheral region, e.g., points C and D. Because the integration leads to a color that has the average hue of the integrated colors and is slightly unsaturated, the hue in the peripheral region is determined by the pixel's orientation with respect to the hue circle, i.e, $\phi$ in FIG. 7. Thus, even with the specular lobe, the structure of the hue circle is maintained, and can be used for the feature extraction.

As shown in the pseudocode in FIG. 8, the above realization leads to a method for specular edge extraction using a single image. We mark a pixel as a part of the specular edge when an $\epsilon$ neighborhood of the pixel contains all different colors or hues. We use N discrete lights to approximate the continuous hue circle, and acquire a single image M by flashing all the lights simultaneously. We convert the image into a hue, saturation, and value (HSV) color space for further processing. Because the center region of the reflected hue circle has a high brightness value and low saturation, we check for this condition to reduce the number of candidates. We count the number of different colors (hues) within the $\epsilon$ neighborhood for each pixel using a histogram. Similar to the method for the white light MFC, we use a threshold to determine specular edges. For example, we set the $\epsilon$ neighborhood to 5×5 pixels and used the following threshold parameters: $V_{th}=0.4$, $S_{th1}=0.6$, $S_{th2}=0.4$, and $D_{th}=3$.

Specular Edges on Screws

Screws and bolts are substantially cylindrical in shape. Curvature of a cylinder in the direction perpendicular to the axis of the cylinder is high but in the direction parallel to the axis is small. This renders the Gaussian curvature of cylinder to be small. Let us now consider the effect of adding threads on the surface of screws. The threads, typically approximated as a helix or a conical spiral, provide high curvature to all the points on the screw even in the direction parallel to the axis of the cylinder. This ensures that the specular highlights are visible in an $\epsilon$ neighborhood independent of the illumination direction.

Figure 9:
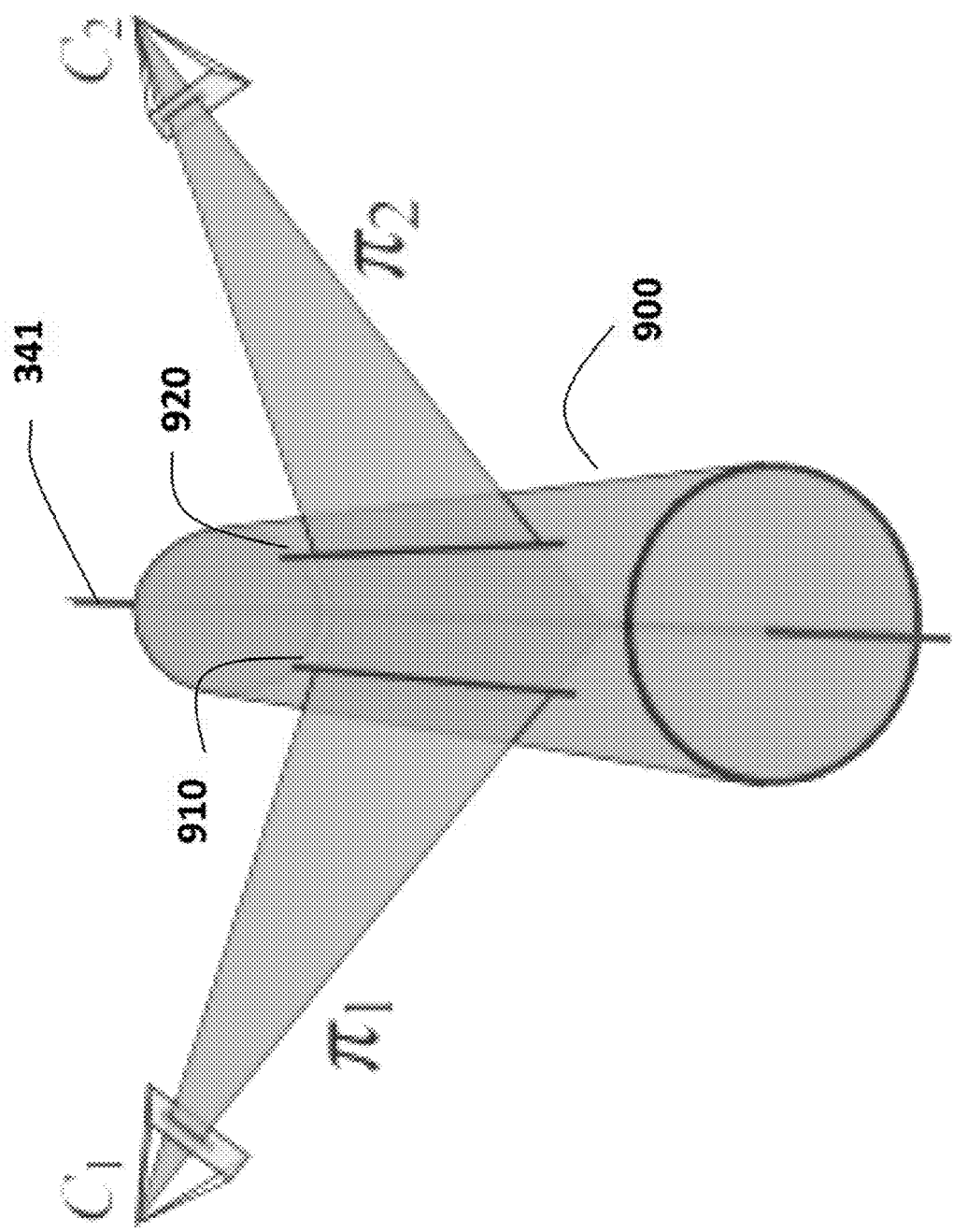
FIG. 9 is a schematic of a screw shape represented as a cylinder with planes intersecting at the axis of the cylinder according to embodiments of the invention.

The specular edges are extracted using the method described above. It is important to analyze the location of the features detected on the screw. The specular edges are detected on high curvature regions having normals towards the camera. We approximate the screw shape with a helix. Points on the helix facing towards the camera lie on a line. In addition, this line lies on the plane joining the camera centers $C_1$ and $C_2$ the axis 341 of the screw, as shown in FIG. 9. For simplicity, the screw shape is shown as a cylinder 900. The lines 910 and 920 on the surface of the cylinder represent the specular edges detected. The symbols $\pi_1$ and $\pi_2$ represent the planes formed by these lines with the respective camera centers. The planes intersect at the axis of the cylinder.

Therefore, we represent the specular edges on the screws with line segments. For line fitting, we use a method based on RANdom SAmple Consensus (RANSAC). Our method initially hypothesizes a variety of lines by selecting a small subset of points and their directions. The support of a line is given by the set of points that satisfy the line equation within a small residual and form a continuous structure. The line segment with the largest support is retained and the procedure is iterated with the reduced set until the support becomes smaller than a few points. The RANSAC method provides inlier points for each line segment. We refine each line segment using the least-squares estimation on the inlier points.

Pose Estimation of Screws

To estimate the pose of a screw, we reconstruct the 3D line corresponding to the axis of the screw, which uniquely determines the orientation and the position of the screw. We determine the specular edges from multiple camera viewpoints and fit line segments to the specular edges in each image. As described before, the detected line segments lie on the plane $\pi_i$ joining the center of projection of the $i^{th}$ camera and the axis of the screw as shown in FIG. 9. The reconstruction of the 3D line corresponding to the axis of the screw is given by the intersection of these planes. We provide methods for reconstructing the central axis for several configurations using different numbers of viewpoints.

3D Line Reconstruction Using Three Views

We use the relation between a 3D line and its corresponding projections in multiple views. We use a geometric constraint to find the lines corresponding to the same screw across three views and reconstruct the 3D line.

Geometry of Line Projection

Consider a line L in the 3D space which is imaged in three views. Let $l_i$ be the projection of L in the $i^{th}$ view and $P_i$ be the projection matrix of the $i^{th}$ view. Using the projection matrix, an image point can be back-projected to a ray passing through the camera center in a common world coordinate system, which we select as the camera coordinate system of the first view. Both end points of the line in the image plane can be back-projected as individual rays. Alternatively, the back projection of an image line $l_i$ corresponds to a plane $\pi_i$ as $$\pi_i : A_i X + B_i Y + C_i Z + D_i = 0. \tag{4}$$

Locating Correspondences

Because multiple screws are arranged randomly in the bin, we need to identify the lines corresponding to the same screw from different views. To locate the correspondences, we use the property that three arbitrary planes do not meet at a single line. This constraint is expressed by the requirement that the 4×3 matrix defined by the coefficients of three planes $$Q = \underbrace{\begin{pmatrix} A_i & B_i & C_i & D_i \\ A_j & B_j & C_j & D_j \\ A_k & B_k & C_k & D_k \end{pmatrix}}_{A \quad b} \quad (5)$$

having rank two.

This constraint is satisfied when the determinants of all the four 3×3 sub-matrices of Q are zero. In practice, due to noise in image measurements, even for lines in correspondence the determinants of these sub-matrices are not zero but small. Therefore, we determine the correspondence cost as a sum of absolute values of four determinant values for each triplet of lines, and select the triplets that have the cost smaller than a threshold.

Reconstruction of the 3D Line

After locating the three lines corresponding to the same screw, we determine the line passing through the axis of the screw. The line equation is $$X = X_0 + \lambda X_1, \quad (6)$$

where $X_0$ is a point, on the line and $X_1$ is the direction of the line. The direction of the line should be determined as perpendicular to all the plane normals as possible. This can be obtained by solving $AX_1 = 0$. The optimum solution, in a least squares sense, is given by the right singular vector corresponding to the smallest singular value of matrix A. We select $X_0$ as the point which is closest to the three planes. This point can be found via the least squares solution of $AX_0 = -b$.

Grasping Position and Orientation

After reconstructing the 3D line, we determine the segment of the line corresponding to the screw by back-projecting the end points of 2D lines in each view and finding the intersection point between the back-projected viewing ray and the reconstructed 3D line. We validate the reconstructed line segment by comparing the length of the reconstructed line segment with the physical length of the screw. The center of the line segment is selected as the 3D grasping position.

We determine one end point of the line segment corresponding to the head of the screw. For the while light MFC, we determine the maximum image in all the views, which is simply a pixel-wise maximum over the eight images. The head of the screw is a smooth region with relatively lower curvature compared to the screw body. Therefore, the specular highlights on the screw head move in a larger neighborhood with the alternating flashes and produce brighter patches in the maximum image compared to the threaded part, of the screw. For the hue circle MFC, we use the value component of the acquired image as the maximum image.

Degeneracy Analysis and Viewpoint Design

If two planes are close to being parallel, then the rank of the matrix Q becomes close to two, regardless of the other plane, leading to a degenerate case in finding correspondence.

As shown in FIG. 10A, a screw lying on one of the planes 1010 passing through the line 1000 joining the two camera centers cannot be reconstructed, because the rank of the matrix Q always becomes two, leading to a degenerate case. Therefore, we use camera viewpoints that minimize such degeneracy. As shown in FIG. 10B, if we randomly place three viewpoints, then there are three sets of the planes leading to degeneracy. The degeneracy can be minimized by placing the three viewpoints on a straight line as in FIG. 10C, where these three sets overlap. If three viewpoints are placed on a line, then there is only a single set of planes, resulting in the smallest number of degenerate cases. FIG. 10D shows camera viewpoint design for the bin-picking system acquiring three views for each pickup cycle. To pickup screws having different orientations, we alternate between the four sets of three viewpoints.

Overlapping Multiple Pickup Cycles

The method described above requires three views for a single pickup. Now, we describe overlapping the multiple pickup cycles such that the method only acquires a single image for a single pickup.

A single pickup of a screw changes the configuration in the bin only locally. Screws that are far from the pickup position do not change their poses. Therefore, we acquire a single image after each pickup, and then use two previous images to perform the three-view pose estimation. As described above, the three viewpoints ideally move along a straight line, while the line direction is changed for different cycles to handle screws with different poses. We achieve these criteria by using a circular camera placement as shown in FIG. 10E, where the continuous three camera viewpoints are kept close to a straight line, while the directions are changed gradually.

Because our system estimates poses of multiple screws in a single cycle, after picking up the first screw, we can pickup other screws continuously. However, this may be less accurate than using the new single image as validation for the non-changed regions.

3D Line Reconstruction Using Two Views

Since two non-degenerate planes from two viewpoints always intersect on a line, finding correspondences using two views is typically difficult. However, the correspondence can be determined if we assume that the 3D lines are located around some plane in the world coordinate system. As shown in FIG. 11B, we use $Z = Z_0$ plane and two viewing planes, and determine the correspondence cost in the same way as the three view case shown in FIG. 11A. This $Z_0$ value can be obtained by approximately measuring the physical distance between the camera and the bin containing screws. The cost favors screw whose Z position is close to $Z_0$ and has an angle close to horizontal. After finding the correspondence, we reconstruct a 3D line as the intersection of two viewing planes without using $Z = Z_0$ plane.

The three-view approach provides superior performance and the multi-cycle overlapping technique that acquires only a single image per pickup is sufficient to have a superior performance as well as a faster cycle time.

EFFECT OF THE INVENTION

The above embodiments provide a novel geometric feature, i.e., a specular edge, that is present on high curvature regions of specular objects. We provide a method for reliably detecting these features by exploiting changing lighting positions using a ring light source approximating a hue circle. We provide a method for pose estimation of shiny screws in a cluttered bin, where we use specular edges detected at multiple viewpoints to reconstruct the axes of screws as 3D lines. We handle degeneracy issues in the 3D line reconstruction and design a circular camera placement to overlap multiple pickups while minimizing the degeneracy and handling a variety of screw poses. We implement our method on a robot platform and provide a single-shot, single-view-per-pickup bin picking system by using the hue circle MFC and the multiple pickup overlap. The system achieves highly accurate pose estimation with location and orientation errors less than 0.5 mm and 0.8°, respectively, and a pickup success rate of more than 90%. The specular edge feature is useful in detecting any shiny object with high curvature.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for extracting features from an image acquired of an object, wherein a surface of the object is specular, comprising the steps of:
   acquiring the image while illuminating the object with a hue circle generated by sets of lights having different colors, wherein each set of lights includes a red, green and blue light emitting diode (LED), and wherein the sets of lights are arranged in a circle around a lens of a camera and flashed simultaneously; and
   extracting, as the features, locations of pixels in the image within a neighborhood of pixels, wherein each pixel includes all of the colors of the sets of lights.

2. The method of claim 1, further comprising:
   determining a pose of the object according to the features.

3. The method of claim 2, wherein the object is a screw.

4. The method of claim 3, wherein the screw is arranged in a bin with other screws, and further comprising:
   acquiring a set of images with a camera;
   fitting lines to the features extracted in each image;
   identifying correspondences of lines across the set of images;
   reconstructing a pose of an axis of the screw according to the line correspondences; and
   grasping the screw according to the pose.

5. The method of claim 4, wherein one image is acquired for each screw to be grasped, and wherein the set of images are sequential in time and overlap each other, and the sequence includes two previous images and a current image.

6. The method of claim 5, further comprising:
   moving the camera circularly while acquiring the set of images.

7. The method of claim 4, wherein a shape of the screw is approximated as a helix, and wherein points on the helix facing the camera are located on the line corresponding to an axis of the screw.

8. The method of claim 4, further comprising:
   moving the camera linearly.

9. The method of claim 1, wherein the hue circle is continuous and maximally saturated.

10. The method of claim 1, further comprising:
    converting the image to a hue, saturation, and value (HSV) space.

11. The method of claim 1, further comprising:
    counting a number of the different colors in the neighborhood using a histogram.

12. The method of claim 1, wherein the neighborhood of pixels is substantially circular, and a radius of the neighborhood is inversely proportional to a curvature of the surface at the locations.

13. The method of claim 1, further comprising:
    fitting an arbitrary shape to the features.

14. A system for extracting features from an image acquired of an object, wherein a surface of the object is specular, comprising:
    a camera;
    sets of lights having different colors and arranged in a circle around a lens of the camera to form a hue circle, wherein each set of lights includes a red, green and blue light emitting diode (LED), and wherein the sets of lights are flashed simultaneously while acquiring the image; and
    a processor configured to extract, as the features, locations of pixels in the image within a neighborhood of pixels, wherein each pixel includes all of the colors of the sets of lights.

15. The system of claim 14, further comprising:
    a robot arm configured to grasp the object according to a pose of the object determined from the features.

16. The system of claim 15, wherein the object is a screw arranged in a bin with other screws, and wherein one image is acquired for each screw to be grasped, wherein the images are in a sequence and overlap each other.

* * * * *